United States Patent [19]
Moser

[11] Patent Number: 5,950,821
[45] Date of Patent: Sep. 14, 1999

[54] COMPACT DISK STORAGE CASE

[75] Inventor: Robert E. Moser, Cape Girardeau, Mo.

[73] Assignee: Blair Industries, Incorporated, Scott City, Mo.

[21] Appl. No.: 08/932,706

[22] Filed: Sep. 18, 1997

[51] Int. Cl.$^6$ ................................................. B65D 85/57
[52] U.S. Cl. ..................................... 206/308.1; 206/472
[58] Field of Search .............................. 206/308.1, 310, 206/387.13, 472, 457

[56] References Cited

U.S. PATENT DOCUMENTS

| | | |
|---|---|---|
| D. 226,146 | 1/1973 | Price . |
| 667,495 | 2/1901 | Butler . |
| 709,687 | 9/1902 | Vernon . |
| 748,631 | 1/1904 | Mitchell . |
| 2,369,864 | 2/1945 | Spaldo . |
| 2,788,041 | 4/1957 | Carver . |
| 2,883,061 | 4/1959 | Moore . |
| 3,028,949 | 4/1962 | Sohosky . |
| 3,092,400 | 6/1963 | Smith . |
| 3,215,450 | 11/1965 | Peterson et al. . |
| 3,315,718 | 4/1967 | Berman . |
| 3,335,847 | 8/1967 | Murphy et al. . |
| 3,414,181 | 12/1968 | Sloan . |
| 3,487,919 | 1/1970 | Elliot et al. . |
| 3,512,332 | 5/1970 | Klein . |
| 3,577,700 | 5/1971 | Bippus et al. . |
| 3,640,379 | 2/1972 | Weingarden . |
| 3,673,760 | 7/1972 | Canamero et al. . |
| 3,737,067 | 6/1973 | Palson . |
| 3,743,081 | 7/1973 | Roberg et al. . |
| 3,814,527 | 6/1974 | Lawes . |
| 3,902,598 | 9/1975 | Koob et al. . |
| 4,049,119 | 9/1977 | Wilson . |
| 4,054,206 | 10/1977 | Kobayashi et al. . |
| 4,078,657 | 3/1978 | Schurman . |
| 4,084,694 | 4/1978 | Lainez et al. ......................... 206/308.1 |
| 4,102,452 | 7/1978 | Sato et al. . |
| 4,127,189 | 11/1978 | Shumrak et al. . |
| 4,175,995 | 11/1979 | Walter . |
| 4,184,594 | 1/1980 | Hehn . |
| 4,209,957 | 7/1980 | Utzmann . |
| 4,231,474 | 11/1980 | Takahashi . |
| 4,277,931 | 7/1981 | Mahaffy et al. . |
| 4,341,307 | 7/1982 | Shyers . |
| 4,407,410 | 10/1983 | Graetz et al. . |
| 4,428,481 | 1/1984 | Basili . |
| 4,432,827 | 2/1984 | Graetz et al. . |
| 4,555,290 | 11/1985 | Graetz et al. . |
| 4,632,717 | 12/1986 | Graetz et al. . |
| 4,717,021 | 1/1988 | Ditzig . |
| 4,724,957 | 2/1988 | Burgschweiger .................... 206/308.1 |
| 4,771,886 | 9/1988 | Johnson . |
| 4,778,051 | 10/1988 | Schaub et al. . |
| 4,789,058 | 12/1988 | Blaney ................ 206/472 X |
| 4,793,477 | 12/1988 | Manning et al. .................... 206/308.1 |
| 4,966,283 | 10/1990 | Sykes et al. . |
| 5,145,068 | 9/1992 | Schmitz et al. . |
| 5,156,271 | 10/1992 | Toner ................................ 206/472 X |
| 5,158,176 | 10/1992 | Wolf ................................. 206/308.1 X |
| 5,285,893 | 2/1994 | Misterka et al. ......................... 206/310 |
| 5,353,932 | 10/1994 | Kollinek . |
| 5,381,894 | 1/1995 | Misterka et al. ......................... 206/310 |
| 5,477,961 | 12/1995 | Taniyama ........................ 206/308.1 X |
| 5,609,250 | 3/1997 | Moser . |
| 5,682,990 | 11/1997 | Schluger .............................. 206/308.1 |
| 5,772,018 | 6/1998 | Walch ................................ 206/308.1 |

FOREIGN PATENT DOCUMENTS

| | | |
|---|---|---|
| 504239 | 7/1951 | Belgium . |
| 2331120 | 11/1975 | France . |
| 2503667 | 4/1981 | France . |
| 2451347 | 10/1974 | Germany . |
| 2030545 | 4/1980 | United Kingdom . |

Primary Examiner—Bryon P. Gehman
Attorney, Agent, or Firm—Hill & Simpson

[57] ABSTRACT

A storage case adapted for the storage of compact disks is provided which has the same general dimensions and exterior appearance as storage cases for VHS videocassettes thereby enabling compact disks and videocassettes to be conveniently stored together on the same shelf or shelving system. Both the top and bottom portions of the storage case include a post on which compact disks can be mounted. Opposing walls of the top and bottom structures also include arcuate recesses for accommodating the outer periphery of the compact disks thereby enabling the compact disk storage case of the present invention to have the same or similar dimensions to storage cases for VHS videocassettes.

12 Claims, 2 Drawing Sheets

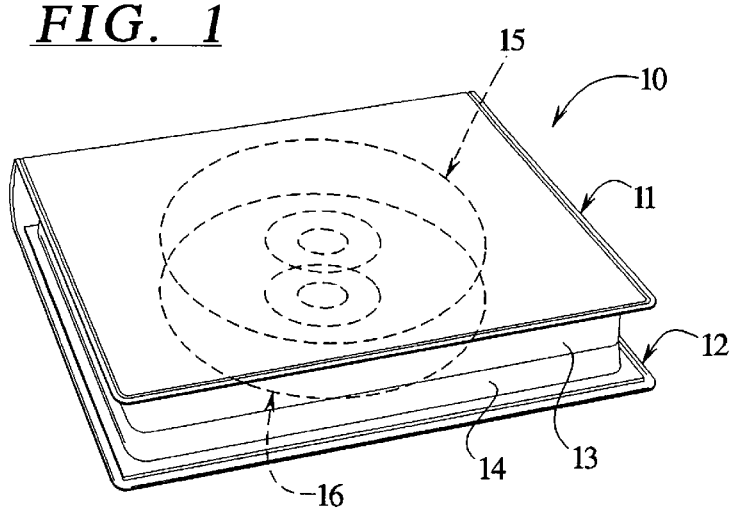
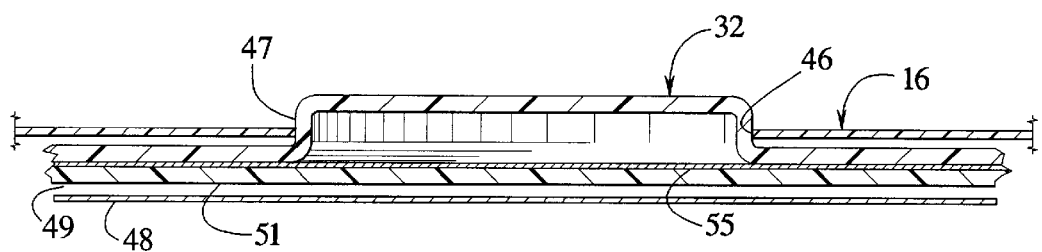
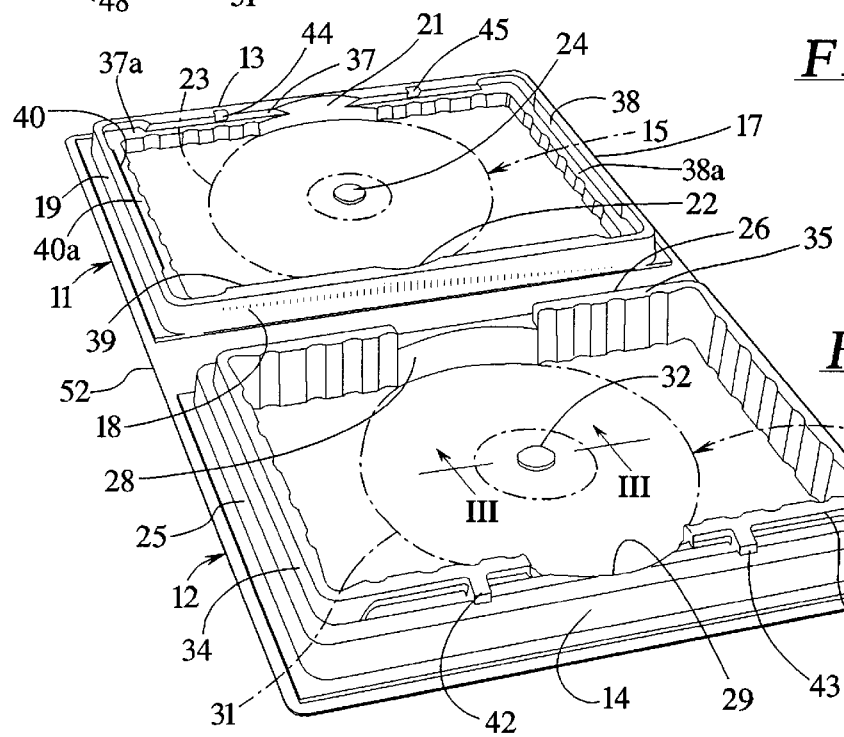

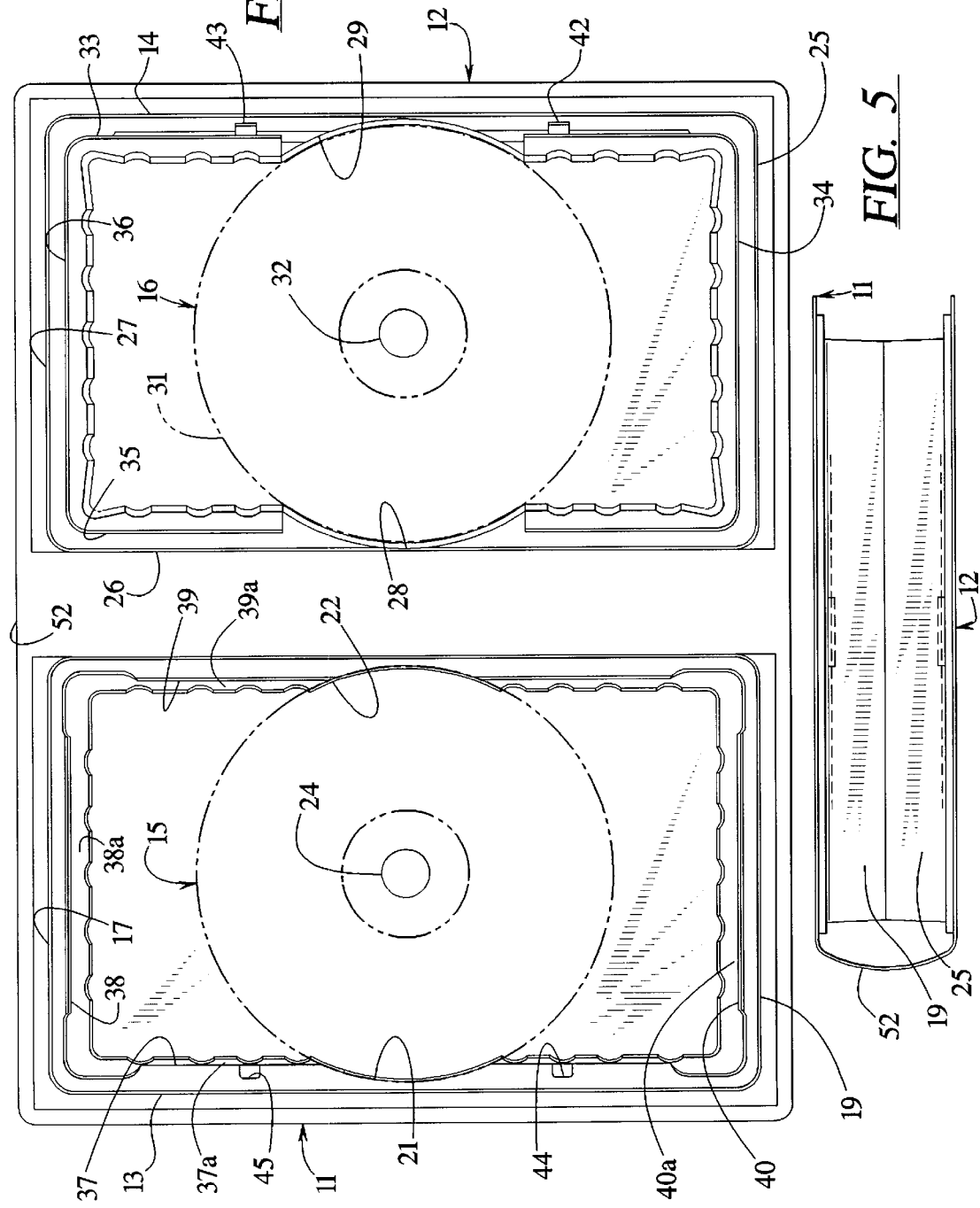

COMPACT DISK STORAGE CASE

BACKGROUND OF THE INVENTION

The present invention relates generally to a storage case and, more specifically, to a storage case which is specifically adapted to store compact disks.

Storage cases which are adapted to store compact disks are known. One type of these storage cases is configured in the form of an album or large notebook where the compact disks are stored in pockets of clear plastic sheets. The user may then flip through the sheets that are bound in the album in order to select the desired cassette. This album-type compact disk storage case is useful for compact disks that store computer programs or compact disks that are stored for archival purposes.

Yet another type of compact disk storage case is provided in the form of a pouch with a single zipper opening. The disks simply slide into or out of the zipper opening. This storage case is useful for travel and the storage of compact disks used in automobile stereo systems.

However, as compact disks are more commonly used to store video presentations such as seminars and movies, it has become logical to store these compact disks in the same area in which videocassettes are stored. To this end, there is a need for a compact disk storage case that can be compatibly stored with videocassette storage cases. For example, it would be beneficial to provide a compact disk storage case that generally has the same dimensions and appearance as a videocassette storage case. The compact disks and videocassettes could be stored on the same shelf using the same or a similar labeling system. The ability to store compact disks in a storage case that looks similar to videocassette storage cases would also have aesthetic benefits because a single shelf or set of shelves housing all of the user's videocassettes and compact disks in uniform looking storage cases would provide a neater and more professional appearance than a system which would include the storage of videocassettes in one type of case and compact disks in another type of case.

Accordingly, there is a need for an improved compact disk storage case that can be compatibly housed with storage cases for VHS videocassettes.

SUMMARY OF THE INVENTION

The present invention satisfies the aforenoted needs by providing a storage case for compact disks that has the same general appearance and dimensions of storage cases for videocassettes. The compact disk storage case of the present invention includes a bottom panel that is flexibly connected to a top panel. The bottom panel includes an inside surface that is connected to at least two upwardly extending opposing walls and an upwardly extending post disposed between the two walls. The post is configured to be mateably engaged in a central opening of a compact disk. The upwardly extending walls each include arcuate recesses in the inside surfaces thereof for accommodating the outer peripheral edge of a compact disk that is mounted on the upwardly extending post. The top panel is further movable between an open position and a closed position where an inside surface of the top panel engages the upwardly extending walls of the bottom panel.

In an embodiment, the top panel also includes an inside surface that is connected to at least two downwardly extending walls and a downwardly extending post centrally disposed between the downwardly extending walls. Like the upwardly extending post of the bottom panel, the downwardly extending post of the top panel is also configured to be frictionally and mateably engaged in the central opening of a compact disk. Still further, like the upwardly extending walls of the bottom panel, the downwardly extending walls of the top panel also include arcuate recesses for accommodating the outer peripheries of a compact disk so that at least one compact disk may be mounted onto the downwardly extending post of the top panel and at least one compact disk may be mounted onto the upwardly extending post of the bottom panel.

In an embodiment, a plurality of compact disks may be mounted onto the upwardly extending post of the bottom panel.

In an embodiment, a plurality of compact disks may be mounted onto the downwardly extending post of the top panel.

In an embodiment, the top and bottom panels are connected by a side panel which is flexibly connected to both the top and bottom panels thereby providing a dual hinge connection.

In an embodiment, the compact disk case of the present invention includes a bottom panel with four upwardly extending walls that form a rectangular enclosure and a top panel that includes four downwardly extending walls to form a rectangular enclosure. Both the top and bottom panels include posts for mateably engaging the central opening of a compact disk; two opposing walls of both the top and bottom panels also include arcuate recesses for accommodating the outer peripheries of compact disks that are mounted onto the posts.

In an embodiment, at least one of the walls of the bottom panel includes an upwardly extending marginal flange and at least one of the walls of the top panel includes a recess or inwardly disposed step shoulder for frictionally receiving the marginal flange of the bottom panel.

In an embodiment, at least one of the walls of the bottom panel includes an outward projection and at least one of the walls of the top panel includes a recess for frictionally receiving the outward projection of the bottom panel.

In an embodiment, the outside surfaces of the top, bottom and side panels of the compact disk case are attached to an outer sheath or sleeve which enables labeling or other indicia to be disposed between the outer sheath and the outside surfaces of the bottom, top and side panels.

It is therefore an advantage of the present invention to provide a compact disk case that has the same or similar appearance to storage cases for videocassettes.

Yet another advantage of the present invention is that it provides a convenient means for storing a plurality of compact disks.

Still another advantage of the present invention is that it provides a storage case for compact disks that may be housed on the same size shelving as shelving intended for the storage of videocassette cases.

Other advantages and objects of the present invention will become apparent upon reading the following detailed description of the drawing.

BRIEF DESCRIPTION OF THE DRAWING

For a more complete understanding of the present invention, reference should now be made to the embodiment illustrated in greater detail in the accompanying drawing and described below by way of an example of the present invention.

In the drawing:

FIG. 1 is a perspective view of a compact disk storage case made in accordance with the present invention in a closed position;

FIG. 2 is a perspective view of the compact disk case shown in FIG. 1 in an open position;

FIG. 3 is a sectional view taken along line 3—3 of FIG. 2;

FIG. 4 is a top plan view of the compact disk case shown in FIG. 1 in the open position; and FIG. 5 is an end view of the compact disk case shown in FIG. 1 in the closed position.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWING INCLUDING THE PRESENTLY PREFERRED EMBODIMENT

Turning first to FIG. 1, a compact disk case 10 is illustrated in the closed position whereby the top panel 11 has been folded over on top of the bottom panel 12. The downwardly extending wall 13 of the top panel 11 is in an abutting, mating engagement with the upwardly extending wall 14 of the bottom panel 12. The case 10 provides a rectangular enclosure for the storage of compact disks shown in phantom at 15, 16.

Turning to FIG. 2, in a preferred embodiment, the top panel 11 includes four connected downwardly extending walls 13, 17, 18, and 19. The connected walls form a rectangular enclosure for the storage of one or more disks 15. The two opposing walls 13, 18 include arcuate recesses 21, 22 for accommodating the outer periphery 23 of the disk 15. The top panel 11 also includes a downwardly extending post 24 which is mateably and frictionally received within a central opening of the disk 15. The post 24 may also be elongated so as to enable the top 11 of the case 10 to accommodate a plurality of compact disks.

Similarly, the bottom panel 12 includes four upwardly extending walls 14, 25, 26 and 27 to form a rectangular enclosure for accommodating a plurality of compact disks 16. The two opposing walls 14, 26 also include arcuate recesses 28, 29 for accommodating the outer periphery of the disk 16. The bottom panel 12 also includes an upwardly extending post 32 which is mateably and frictionally received in the central opening of the disk 16. The post 32 may also be elongated so as to enable the post and the enclosure of the bottom panel 12 to accommodate a plurality of disks 16.

The bottom panel 12 also includes upwardly extending flanges 33, 34, 35 and 36 that extend upward from the walls 14, 25, 26 and 27 respectively. As shown in FIGS. 2 and 4, the flanges 33–36 are frictionally received against the inside sidewall surfaces 37–40 as well as the inner shoulder surfaces 37a–40a of the top panel 11 to provide a friction fit when the top panel 11 is closed against the bottom panel 12. An additional mechanism to provide a secure fit is provided by the projections 42, 43 attached to the flange 33 of the wall 14 which are received in the recesses 44, 45 respectively in the wall 13 of the top panel 11 when the top panel 11 is closed against the bottom panel 12.

As illustrated in FIG. 3, the post 32 is configured to provide a friction fit between the inside opening 46 of the compact disk 16 and the side wall 47 of the post 32. In addition, a clear plastic sheet 48 may be attached to the outer edges of the top panel 11 and bottom panel 12 so that labeling or other indicia may be inserted into the space 49 between the outside surface 51 and the sheet 48 as shown in FIG. 3. The sheet 48 may also extend around the side panel 52 so that the outer surface of the side panel may be labeled for easy visibility when a plurality of cases are stacked on a shelf such as a bookshelf with the side panels 52 extending outward (see also FIG. 5). An example of the attachment of the clear plastic sheet to the case is provided in U.S. Pat. No. 5,609,250, which is incorporated herein by reference.

The interior portions of the case 10 may be fabricated from molded plastic material. The exterior panels are also preferably fabricated from a flexible plastic material which permits the exterior portions of the top, bottom and side panel to be fabricated from a single piece of plastic. A stiffening member such as that shown at 55 in FIG. 3 may also be incorporated into the top panel 11 and bottom panel 12.

From the above description, it is apparent that the objects and advantages of the present invention have been achieved. While only one embodiment has been set forth, alternative embodiments and various modifications will be apparent from the above description to those skilled in the art. These and other alternatives are considered equivalents and within the spirit and scope of the present invention.

What is claimed is:

1. A storage case for compact disks, the compact disks having central openings and outer peripheries, the compact disk storage case being similar in appearance to storage cases for videocassettes, the compact disk storage case comprising:

a bottom panel flexibly connected to a top panel, the bottom panel including an inside surface integrally molded to two upwardly extending and opposing exterior walls and connected to an upwardly extending post disposed between the upwardly extending exterior walls for mateably engaging the central opening of at least one compact disk, each of the upwardly extending exterior walls includes an inside surface, the inside surfaces of the upwardly extending exterior walls each defining an arcuate recess for accommodating the outer periphery of each compact disk when each compact disk is mounted onto the post, the top panel being movable between a closed position where an inside surface of the top panel engages the upwardly extending exterior walls of the bottom panel to an open position which permits access to the upwardly protruding post.

2. The case of claim 1 wherein the top and bottom panels have a common width and a common length, the width and length of the top and bottom panels being identical to a width and length of a standard storage case for videocassettes.

3. The case of claim 1 wherein the top panel includes an inside surface that is connected to two downwardly extending walls and a downwardly extending post disposed between the downwardly extending walls for mateably engaging the central opening of at least one compact disk, each of the downwardly extending walls including inside surfaces, the inside surfaces of the downwardly extending walls including arcuate recesses for accommodating the outer periphery of each compact disk when each compact disk is mounted onto the post, and wherein the downwardly extending walls of the top panel engage the upwardly extending walls of the bottom panel when the top panel is moved to the closed position.

4. The case of claim 1 wherein the arcuate recesses have a combined arcuate length which is substantially less than a circumferential length of the outer periphery of each compact disk.

5. A storage case for compact disks, the compact disk having central openings and outer peripheries, the compact disk storage case being similar in appearance to storage cases for videocassettes, the compact disk storage case comprising:

a side panel disposed between and flexibly connected to a bottom panel and a top panel, the top panel including an inside surface integrally molded to two downwardly extending exterior walls and connected to a downwardly extending post disposed between the downwardly extending exterior walls for mateably engaging the central opening of at least one compact disk, each of the downwardly extending exterior walls including inside surfaces, the inside surfaces of the downwardly extending exterior walls defining arcuate recesses for accommodating the outer periphery of each compact disk when each compact disk is mounted onto the post, the bottom panel including an inside surface integrally molded to two upwardly extending exterior walls and connected to an upwardly extending post disposed between the upwardly extending exterior walls for mateably engaging the central opening of at least one compact disk, each of the upwardly extending exterior walls including inside surfaces, the inside surfaces of the upwardly extending exterior walls including arcuate recesses for accommodating the outer periphery of each compact disk when each compact disk is mounted onto the post, the top panel being movable between a closed position wherein the downwardly extending exterior walls of the top panel engage the upwardly extending exterior walls of the bottom panel to an open position which permits access to the inside surfaces of the top and bottom panels.

6. The case of claim 5 wherein the top and bottom panels have a common width and a common length and the side panel has a width and a length and wherein the width and length of the top and bottom panels and the width and length of the side panel being identical to that of a standard storage case for videocassettes.

7. The case of claim 5 wherein the arcuate recesses in the downwardly extending exterior walls on the top panel have a combined arcuate length which is substantially less than a circumferential length of the outer periphery of each compact disk, and wherein the arcuate recesses in the upwardly extending exterior walls on the bottom panel have a combined arcuate length which is substantially less than the circumferential length of the outer periphery of each compact disk.

8. A storage case for compact disks, the compact disks having central openings and outer peripheries, the compact disk storage case being similar in appearance and dimension to storage cases for videocassettes, the compact disk storage case comprising:

a side panel disposed between and flexibly connected to a bottom panel and a top panel, the top and bottom panels having matching lengths and widths corresponding to the dimensions of videocassette cases, the top panel including an inside surface integrally molded to two opposing pairs of downwardly extending exterior walls to form a rectangular enclosure and connected to a downwardly extending post centrally disposed between the downwardly extending exterior walls for mateably engaging the central opening of at least one compact disk, one of the pairs of downwardly extending exterior walls including inside surfaces defining arcuate recesses for accommodating the outer periphery of each compact disk when each compact disk is mounted onto the post, the bottom panel including an inside surface integrally molded to two opposing pairs of upwardly extending exterior walls to form a rectangular enclosure and connected to an upwardly extending post centrally disposed between the upwardly extending exterior walls for mateably engaging the central opening of at least one compact disk, one pair of the upwardly extending exterior walls including inside surfaces with arcuate recesses for accommodating the outer periphery of each compact disk when each compact disk is mounted onto the post, The top panel being movable between a closed position wherein the downwardly extending exterior walls of the top panel engage the upwardly extending exterior walls of the bottom panel to an open position which permits access to the inside surfaces of the top and bottom panels.

9. The case of claim 8 wherein at least one of the upwardly extending walls includes an upwardly extending marginal flange and at least one of the downwardly extending walls includes a recessed area for frictionally receiving said upwardly extending marginal flange when the case is in the closed position.

10. The case of claim 8 wherein at least one of the upwardly extending walls includes a projection and at least one of the downwardly extending walls includes a recessed area for frictionally receiving said projection when the case is in the closed position.

11. The case of claim 8 wherein the top and bottom panels have a common width and a common length and the side panel has a width and a length and wherein the width and length of the top and bottom panels and the width and length of the side panel being identical to that of a standard storage case for videocassettes.

12. The case of claim 8 wherein the arcuate recesses in the downwardly extending exterior walls on the top panel have a combined arcuate length which is substantially less than a circumferential length of the outer periphery of each compact disk, and wherein the arcuate recesses in the upwardly extending exterior walls on the bottom panel have a combined arcuate length which is substantially less than the circumferential length of the outer periphery of each compact disk.

* * * * *